United States Patent
Balchandran et al.

(10) Patent No.: US 8,285,539 B2
(45) Date of Patent: Oct. 9, 2012

(54) EXTRACTING TOKENS IN A NATURAL LANGUAGE UNDERSTANDING APPLICATION

(75) Inventors: Rajesh Balchandran, Congers, NY (US); Linda M. Boyer, Ossining, NY (US); Gregory Purdy, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1334 days.

(21) Appl. No.: 11/764,285

(22) Filed: Jun. 18, 2007

(65) Prior Publication Data

US 2008/0312905 A1    Dec. 18, 2008

(51) Int. Cl.
*G06F 17/27* (2006.01)
(52) U.S. Cl. .............. 704/9; 704/1; 704/10; 704/257; 704/3; 709/232; 715/255; 718/100
(58) Field of Classification Search .............. 704/1, 9, 704/257, 10, 3; 709/232; 715/255; 718/100
See application file for complete search history.

(56) References Cited

U.S. PATENT DOCUMENTS

| | | | |
|---|---|---|---|
| 5,477,451 A | 12/1995 | Brown et al. | |
| 5,625,748 A | 4/1997 | McDonough et al. | |
| 5,675,706 A | 10/1997 | Lee et al. | |
| 6,311,152 B1 * | 10/2001 | Bai et al. | 704/9 |
| 6,470,306 B1 * | 10/2002 | Pringle et al. | 704/3 |
| 6,609,087 B1 | 8/2003 | Miller et al. | |
| 6,615,172 B1 * | 9/2003 | Bennett et al. | 704/257 |
| 6,732,090 B2 | 5/2004 | Shanahan | |
| 6,931,351 B2 | 8/2005 | Verma et al. | |
| 6,990,442 B1 * | 1/2006 | Davis | 704/9 |
| 7,275,033 B1 | 9/2007 | Zhao | |
| 7,360,151 B1 * | 4/2008 | Froloff | 715/255 |
| 7,509,578 B2 | 3/2009 | Rujan et al. | |
| 2002/0002450 A1 | 1/2002 | Nunberg | |
| 2002/0099730 A1 | 7/2002 | Brown et al. | |
| 2002/0123891 A1 | 9/2002 | Epstein | |
| 2003/0069880 A1 * | 4/2003 | Harrison et al. | 707/3 |
| 2003/0149714 A1 * | 8/2003 | Casati et al. | 709/100 |
| 2003/0191625 A1 * | 10/2003 | Gorin et al. | 704/1 |
| 2004/0148170 A1 * | 7/2004 | Acero et al. | 704/257 |
| 2005/0066050 A1 * | 3/2005 | Dharamshi | 709/232 |
| 2006/0047502 A1 * | 3/2006 | Ramsey et al. | 704/10 |
| 2006/0116862 A1 * | 6/2006 | Carrier et al. | 704/1 |
| 2007/0106496 A1 | 5/2007 | Ramsey | |
| 2007/0124134 A1 | 5/2007 | Van Kommer | |
| 2008/0208567 A1 | 8/2008 | Brockett et al. | |
| 2008/0310718 A1 | 12/2008 | Balchandran et al. | |
| 2008/0312904 A1 | 12/2008 | Balchandran et al. | |
| 2008/0312906 A1 | 12/2008 | Balchandran et al. | |
| 2010/0100380 A1 | 4/2010 | Tur | |

* cited by examiner

*Primary Examiner* — Michael Colucci
(74) *Attorney, Agent, or Firm* — Cuenot, Forsythe & Kim, LLC

(57) ABSTRACT

A method of processing text within a natural language understanding system can include applying a first tokenization technique to a sentence using a statistical tokenization model. A second tokenization technique using a named entity can be applied to the sentence when the first tokenization technique does not extract a needed token according to a class of the sentence. A token determined according to at least one of the tokenization techniques can be output.

20 Claims, 2 Drawing Sheets

EXTRACTING TOKENS IN A NATURAL LANGUAGE UNDERSTANDING APPLICATION

BACKGROUND OF THE INVENTION

Natural language understanding (NLU) refers to the technology that allows computers to understand, or derive meaning from, written human languages. In general, NLU systems determine meaning from text. The meaning, and potentially other information extracted from the text, can be provided to other systems. The meaning can drive business logic, effectively trigging some programmatic function corresponding to the meaning. In general, determining meaning from text involves two tasks referred to as "interpretation" and "token extraction." Interpretation refers to the determination of intent from a text input or the determination of an intended action implied by a text input, e.g., a class. Token extraction refers to the identification of keywords or "tokens" specified in the text input that support, or further elaborate upon, the determined intent.

In some cases interpretation alone is sufficient to resolve the meaning of a text input. For example, a text input such as "How much do I have in my account" specifies an intent or class such as "request account balance." No tokens are needed to further elaborate upon the request for the account balance. In other cases, tokens are needed to resolve the meaning of the text input. For example, the text input "I'd like to order call forwarding" suggests a request for ordering a service or a product. The particular product desired, however, is not known unless token extraction is applied, in which case, the phrase "call forwarding" can be extracted as a token specifying a particular type of requested service.

Often tokens are extracted using "named entities." Named entities, effectively, are place holders that map to grammars. In the example above, the phrase "call forwarding" can map to a "service" named entity. The service named entity can map to a grammar specifying the various services that can be understood or recognized, e.g., call waiting, call forwarding, voice mail, or other keywords and/or phrases indicative of a particular service.

In some cases, text inputs include no named entities, making token extraction difficult. For example, the text input "I want to see the name and number of the person calling before I answer the phone," does not include the phrase "caller ID." Though the text input refers to caller ID, which would be mapped to, for example, the service named entity, the text input does not explicitly include the phrase "caller ID."

In other cases, the text input does include a named entity; however, the named entity is used in a different context. The context in which the named entity exists within the sentence is not relevant to the determined intent. For example, in the text input "I am not receiving any phone calls, they go straight to voice mail," the term "voicemail" would be identified as a named entity. The object of the problem, however, is that the user is not receiving calls. Voicemail is not the object of the problem. Identifying "voicemail" as a named entity in this case can lead to an incorrect resolution of the meaning of the text input.

BRIEF SUMMARY OF THE INVENTION

The embodiments disclosed herein relate to natural language understanding (NLU) systems and, more particularly, to token extraction or tokenization. One embodiment of the present invention can include a method of processing text within an NLU system. The method can include applying a first tokenization technique to a sentence using a statistical tokenization model. A second tokenization technique using a named entity can be applied to the sentence when the first tokenization technique does not extract a needed token according to a class of the sentence. A token determined according to at least one of the tokenization techniques can be output.

Another embodiment of the present invention can include a method of processing text within an NLU system. The method can include determining a class for a sentence received by the NLU system at runtime and processing the sentence using a first statistical tokenization model. The sentence can be processed using a named entity when a token that is needed according to the class is not extracted using the first statistical tokenization model. The sentence can be processed using a second statistical tokenization model when a token that is needed according to the class is not extracted using the named entity. A token determined according to at least one of the first statistical tokenization model, the named entity, or the second statistical tokenization model can be output.

Yet another embodiment of the present invention can include a computer program product including a computer-usable medium having computer-usable code that, when executed, causes a machine to perform the various steps and/or functions described herein.

DETAILED DESCRIPTION OF THE INVENTION

Figure 1:
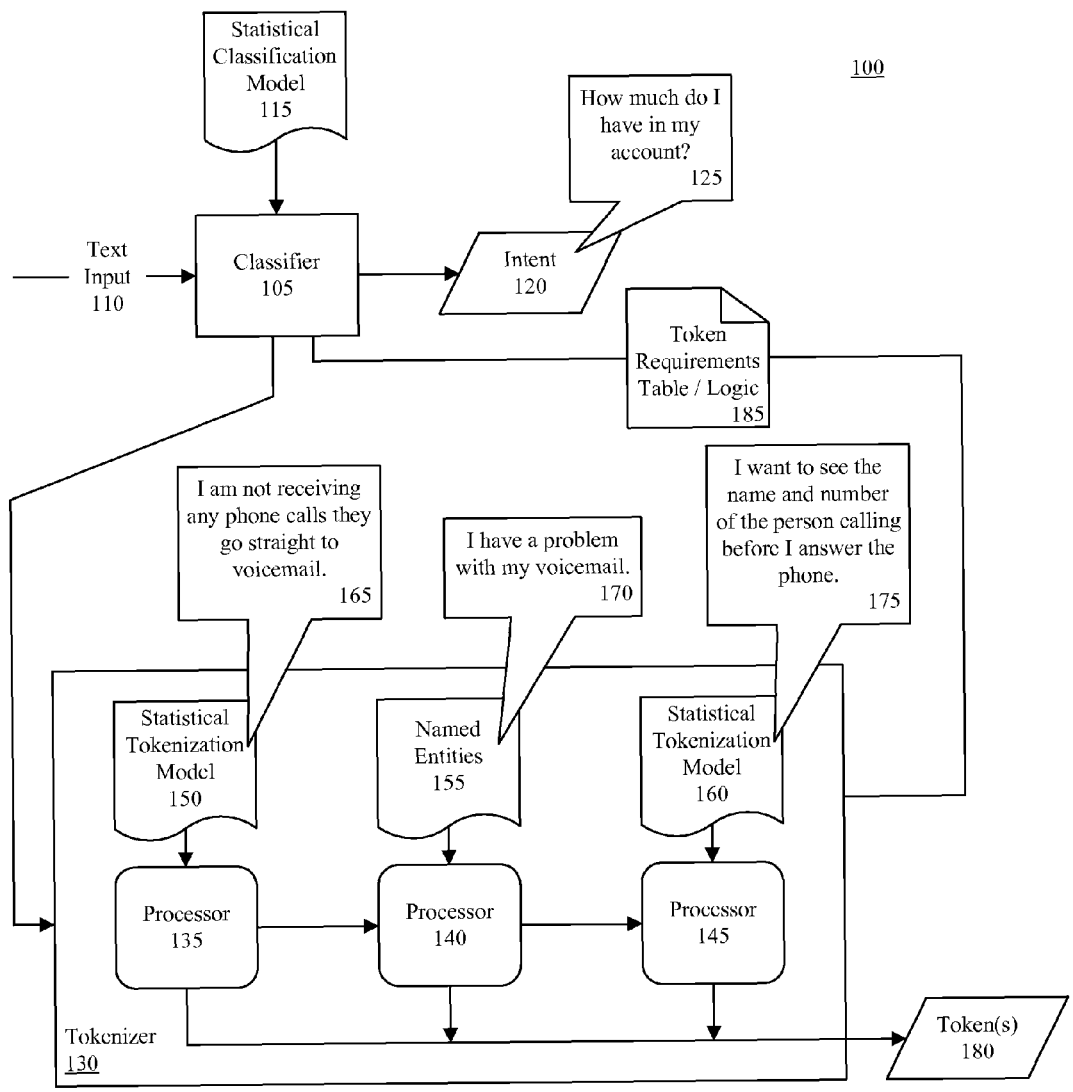
FIG. 1 is a block diagram illustrating a natural language understanding system in accordance with one embodiment of the present invention.

As will be appreciated by one skilled in the art, the present invention may be embodied as a method, system, or computer program product. Accordingly, embodiments of the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk—read only memory (CD-ROM), a compact disk—read/write (CD-R/

W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

Embodiments of the present invention are described below with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The embodiments disclosed herein relate to the processing of text inputs within a natural language understanding (NLU) system and to the task of token extraction (tokenization) within such a system. A text input, or sentence, received by an NLU system can be processed using a plurality of different tokenization techniques. The term "sentence," as used herein, refers to a portion of text including, but not limited to, a grammatically correct sentence, a grammatically incorrect sentence, a fragment or part of a sentence, a phrase, or any other portion or unit of text that can be received by an NLU system, whether derived from speech input, keyboard entry, or the like.

One or more of the tokenization techniques can apply a statistical tokenization model to perform token extraction while one or more other tokenization techniques can rely upon one or more named entities for token extraction. The application of a variety of tokenization techniques to a sentence facilitates more accurate tokenization. The tokenization techniques also can be applied in an order that effectively filters the received sentence such that each sentence is more likely to be processed using a tokenization technique that is better suited to that sentence. This leads to a higher likelihood that accurate tokenization is performed.

FIG. 1 is a block diagram illustrating an NLU system 100 in accordance with one embodiment of the present invention. As shown, the system 100 can include a classifier 105, a tokenizer 130, and a token requirements 185. The classifier 105, at runtime, receives a text input 110 and determines one of a plurality of classes into which the text input 110 belongs. The classifier 105 can output the determined class for the text input 110 as intent 120. As used herein, "outputting" or "output" can include, but is not limited to, writing to a file, writing to a user display or other output device, playing audible notifications, sending or transmitting to another system, exporting, or the like.

The classifier 105 utilizes a statistical classification model 115 to classify the received text input 110. The statistical classification model 115 can specify a particular number of classes, e.g., "M" classes. Each class indicates, or is associated with, a particular intent or action. The class to which the text input 110 belongs is selected from the M classes of the statistical classification model. The token requirements 185 indicates which classes do not require any additional processing beyond classification and which classes require tokenization.

The tokenizer 130 extracts or determines one or more tokens from sentences that require further processing beyond classification. Tokenization requirements can be specified on a class-by-class basis, including which tokens are needed by each particular class. That is, for each class specified by the statistical classification model 115, the token requirements 185 can indicate whether tokens are needed as well as which tokens are needed to specify meaning.

In some cases, the text input 110 can be classified into a particular class for which the intent 120 fully resolves or specifies the meaning of the sentence. For example, if the text input 110 is sentence 125, which reads "How much do I have in my account?", the determination of a class for sentence 125 fully resolves the meaning of text input 110. The text input 110 can be classified into a class such as "account balance request." In that case, no further information, e.g., a token, is needed to process the request. The meaning of sentence 125 can be expressed by the class "account balance request," which is output as intent 120, with no tokens.

The determination as to whether the text input 110 requires further processing, e.g., tokenization, can be made with reference to the token requirements 185. Once the class of text input 110 is determined, the classifier 105 can locate that class within the token requirements 185. In this case, the token requirements 185 can indicate that the class "account balance request" requires no tokenization, e.g., no tokens are needed to resolve the meaning of sentence 125. It should be appreciated that the token requirements 185 can be stored in any of a variety of different formats and/or data structures, e.g., as a table, a database, a text file, etc. As such the embodiments disclosed herein are not intended to be limited by the particular manner in which the token requirements 185 are stored or specified.

Continuing with FIG. 1, in other cases text inputs are categorized, or classified, into classes that do require tokenization to resolve the meaning of the text. As noted, the decision whether to pass text input 110 to the tokenizer 130 can be made according to the token requirements 185. If the text input 110 requires tokenization, the text input can be passed to the tokenizer 130. The tokenizer 130 can extract one or more tokens from the text input 110 and output any tokens extracted from the text input as token(s) 180.

The tokenizer 130 can apply a plurality of different tokenization techniques to extract tokens 180 from the text input 110. In one embodiment, the tokenizer 130 can include a plurality of processors 135, 140, and 145, each applying a particular tokenization technique to the text input 110. Processors 135 and 145 each can apply a statistical model-based tokenization technique to the text input 110. Processor 140 can apply a named entity-based tokenization technique to the text input 110.

Though the processors 135-145 are illustrated as separate entities, it should be appreciated that one or more of the processors 135-145 can be implemented as a single, larger processor capable of performing two or more or all of the tokenization techniques. For example, a single processor can be implemented in place of processors 135 and 145. In another example, a single processor can be implemented in place of each of processors 135, 140, and 145.

In any case, processor 135 can apply a statistical tokenization model 150 to the text input 110. The statistical tokenization model 150 can be trained, or constructed, to extract tokens from sentences. More particularly, the statistical tokenization model 150 can extract tokens from the text input 110 that include a named entity that is used in a different context than originally conceived when the named entity was constructed. The named entity is not relevant to the object of the sentence, e.g., is tangential. In other words, the named entity does not correlate with, or is not highly correlated with, the desired token for the class into which the text input 110 has been assigned by the classifier 105.

The sentences of the training data used to generate the statistical tokenization model 150 can include at least one named entity. Each sentence can be tagged or annotated as belonging to a particular class. Each of the sentences included in the training data can be determined, whether manually or automatically, to include a named entity that has a low correlation with respect to the class associated with the sentence. In one example, a low correlation can indicate that the type of named entity within the sentence does not conform to the type of token needed to determine a meaning for the sentence. The token needed for a given class may be "service," while the named entity within the sentence is for a date or a proper name. In another example, a low correlation can indicate that the sentence includes a named entity that does correspond with the type of token needed, but that the named entity is used in a different context.

In illustration, consider the case where a sentence 165 is received as the text input 110. Sentence 165 reads "I am not receiving any phone calls they go straight to voice mail." Sentence 165 includes a named entity "voicemail." The named entity can map to a service grammar. In this case, the named entity is not indicative of the problem that is being experienced by the user. The named entity reflects a symptom of the problem, but not the problem itself. The problem is that the user is not receiving telephone calls.

The classifier 105 can classify the sentence 165 into a class such as "report problem" which can be output as the intent 120. From the token requirements 185, the NLU system can determine that tokenization is required for the class "report problem." The token requirements 185 can specify that one token specifying an object of the problem is needed for the class "report problem." Accordingly, the processor 135, using the statistical tokenization model 150, can extract a token 180 from the sentence 165. For example, the "not receiving any phone calls" can be identified and matched to a token of "no phone calls" or the like. The token "no phone calls" can be output as token 180. Having determined the tokens necessary for the class "report problem," according to the token requirements 185, the tokenizer 130 can discontinue processing the text input 110. That is, the tokenizer 130 need not process the sentence 125 through processor 140 or processor 145.

When the processor 135 is unable to determine one or more or all of the needed tokens for the text input 110 as specified by the token requirements 185, the text input 110 can be passed onto processor 140. Processor 140 can apply a named entity tokenization technique to the sentence. Because sentences that include a named entity with a low correlation to the needed tokens have been processed by processor 135, such sentences effectively are filtered and can be prevented from being processed by the processor 140, e.g., processing is stopped after processor 135 unless at least one further token is required or needed. This lowers the likelihood that a sentence with a named entity with a low correlation to a needed token will be processed through processor 140 or processor 145.

In illustration, the text input 110 can be sentence 170 which reads "I have a problem with my voice mail." Sentence 170 can be classified by the classifier 105 as belonging to the class "report problem." Accordingly, tokenization is needed as specified by the token requirements 185. The processor 135 will not likely extract tokens from sentence 170 as the statistical tokenization model 150 is not trained to operate on sentences such as sentence 170, e.g., sentences including a named entity having a high correlation to the tokens needed for the class "report problem," or any other class.

Sentence 170 can be processed by processor 140 using named entities 155. Through application of the named entities 155, the processor 140 can extract a token indicating the object of the problem. Accordingly, the processor 140 can extract the word "voicemail" as the token indicating the object of the problem and provide that token as output token 180.

Processor 145 can process text input 110 when not correctly processed by either processor 135 or processor 140. Processor 145 can apply a statistical tokenization model 160. The statistical tokenization model 160 can be constructed from sentences that do not include or specify a named entity, whether automatically or manually tagged or annotated. Thus, consider the case where the text input 110 is sentence 175 which reads "I want to see the name and number of the person calling before I answer the phone." Sentence 175 can be classified as belonging to the class "order service." The classifier 105 can determine that the sentence requires tokenization using the token requirements 185. For example, the class "order service" can require a token such as "service" that indicates the particular service being ordered.

Since sentence 175 does not include any named entities, neither processor 135 nor processor 140 can reliably extract the token needed for the "order service" classification of sentence 175. Since one or more or all of the tokens needed for the "order service" class are not extracted from sentence 175 by either processor 135 or processor 140, sentence 175 is passed on to processor 145 for processing using the statistical tokenization model 160. Processor 145, using statistical tokenization model 160, can determine that the text of sentence 175 indicates "caller ID" as the service token. Accordingly, processor 145 can output "caller ID" as the token 180.

It should be appreciated that the order in which the tokenization techniques are applied also can be modified from the order shown in FIG. 1. For example, in one embodiment, the statistical tokenization models 150 and 160 can be applied in succession, e.g., both prior to application of the named entity tokenization technique. In another embodiment, the third tokenization technique, e.g., processor 145 and statistical tokenization model 150 may not be necessary. For example, the application of processor 135 and statistical tokenization model 150 can be a filtering step inserted prior to the named entity tokenization technique to increase the likelihood of successful token extraction using named entities.

Figure 2:
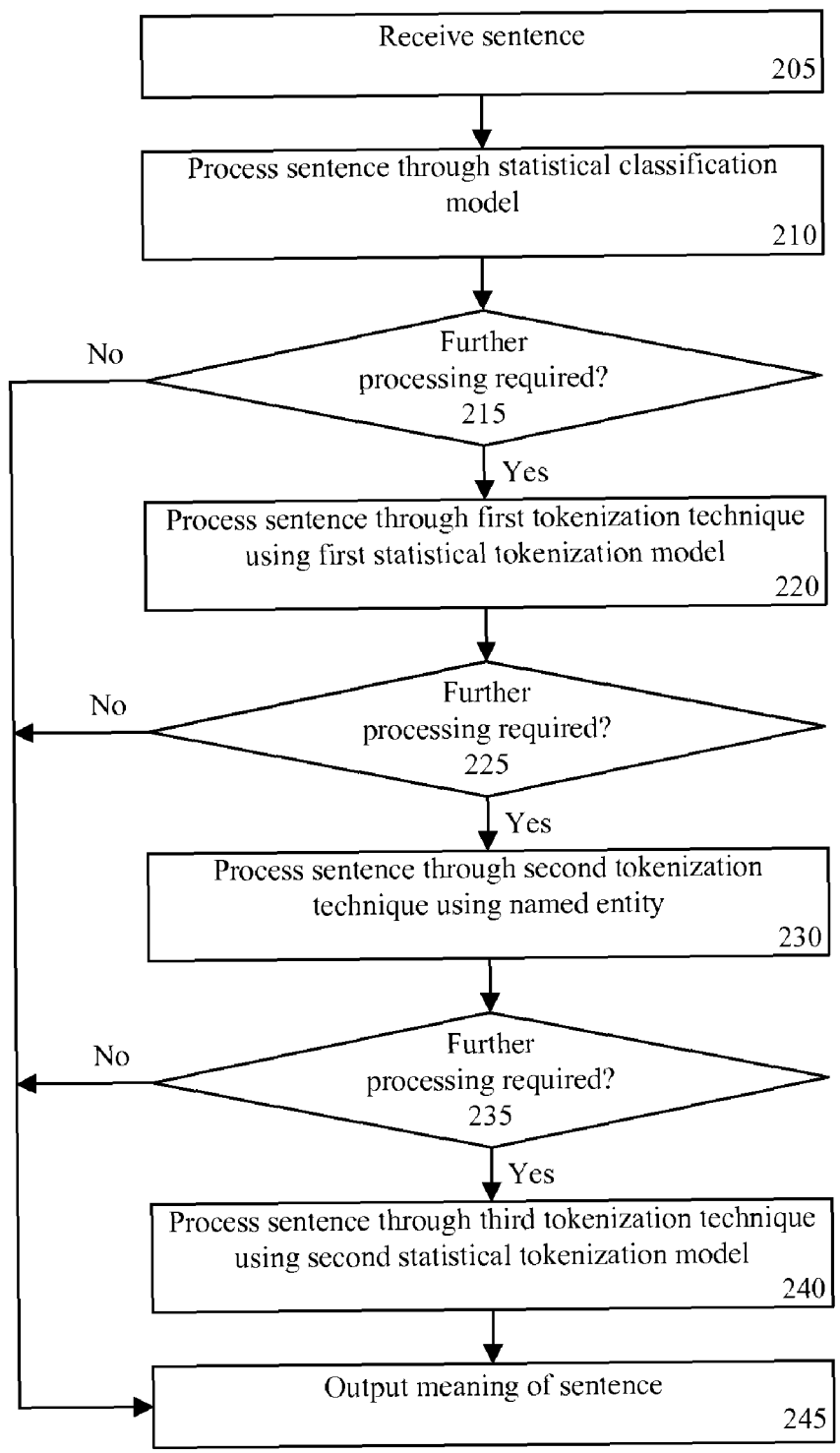
FIG. 2 is a flow chart illustrating a method of processing text in accordance with another embodiment of the present invention.

FIG. 2 is a flow chart illustrating a method 200 of processing text in accordance with another embodiment of the present invention. The method 200 can be implemented within an NLU system including a tokenizer as described with reference to FIG. 1. The method 200 can begin in step 205 where a sentence can be received as input. The sentence can be any text received by the NLU system, whether derived from a speech input, keyboard entry, or the like. In step 210, the sentence can be processed using a statistical classification model. The sentence can be processed using a classifier having a statistical classification model that is trained to classify sentences into one of "M" number of possible classes. Accordingly, the sentence can be classified as belonging to a particular one of the M classes using the statistical classification model.

In step 215, a determination can be made as to whether further processing of the sentence is required to determine, or resolve, the meaning of the sentence. As noted, the classifier can access the token requirements that lists whether any tokens are needed for each class of the statistical classification model on a class-by-class basis. If no further processing, e.g., tokenization, is needed, the method can continue to step 245 to output the meaning of the sentence. In that case, the meaning of the sentence can be specified by the class into which the sentence has been classified or assigned. That is, the meaning can be specified by the intent without tokens.

If further processing is required, the method can continue to step 220 where a first tokenization technique can be applied. In step 220, the sentence can be processed using a first statistical tokenization model. The first statistical tokenization model can be one that has been constructed, or trained, using a plurality of sentences, where each sentence includes at least one named entity that has a low correlation with the class into which that sentence has been tagged or otherwise associated.

In step 225, a determination as to whether further processing is required can be made. In one embodiment, if one or more tokens are extracted in step 220 as the tokenization result of the first tokenization technique, the method can continue to step 245. If the tokenization result of the first tokenization technique includes no tokens, e.g., no tokens are extracted from the sentence in step 220, the method can proceed to step 230. In another embodiment, if one or more or all tokens needed for the class of the sentence have not yet been determined, e.g., are not specified by the tokenization result, the method can proceed to step 230. For example, some classes require more than one token. Accordingly, those sentences corresponding to a class that requires more than one token for meaning determination, as specified by the token requirements, can be processed further until the needed tokens are determined or extracted.

In step 230, the sentence can be processed using a second tokenization technique, e.g., a named entity tokenization technique. The sentence can undergo processing using named entities to extract tokens. In step 235, a determination as to whether further processing is needed for the sentence can be made. If further processing is needed, the method can proceed to step 240. If not, the method can proceed to step 245. The determination as to whether further processing is needed can be made in similar fashion to step 225, e.g., whether one or more or all needed tokens for the class of the sentence have been extracted as part of the tokenization result of the second tokenization technique.

Continuing with step 240, a third tokenization technique can be applied to the sentence. The sentence can be processed using a second statistical tokenization model to determine any needed tokens for the sentence. The second statistical tokenization model can be built or generated from sentences that do not include any named entities. In step 245, the meaning of the sentence can be output. For example, the class as well as any determined tokens can be output for use by another system.

The flowchart and block diagrams in the figures illustrate the architecture, functionality, and operation of possible implementations of systems, methods and computer program products according to various embodiments described herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments of the present invention have been presented for purposes of illustration and description, but are not intended to be exhaustive or limited to the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method of processing text within a natural language understanding system, the method comprising:
   via a processor, applying a first tokenization technique to a sentence using a statistical tokenization model;
   via the processor, applying a second subsequent tokenization technique to the sentence using a named entity only when the first tokenization technique does not extract a needed token according to a class of the sentence; and
   via the processor, outputting a token determined according to at least one of the tokenization techniques.

2. The method of claim 1, further comprising, via the processor, first determining the class for the sentence using a statistical classification model.

3. The method of claim 2, further comprising, via the processor, determining whether tokenization is needed according to the class of the sentence.

4. The method of claim 3, further comprising, via the processor, identifying the needed token according to the class.

5. The method of claim 1, wherein applying a first tokenization technique further comprises selecting the first statistical tokenization model to be a statistical tokenization model trained using sentences comprising a named entity having a low correlation with the needed token.

6. The method of claim 1, further comprising:
   via the processor, determining whether at least one token is needed according to the class and a tokenization result of the first tokenization technique; and
   when no further tokens are needed, via the processor, discontinuing processing of the sentence and outputting at least one token determined for the sentence.

7. The method of claim 1, further comprising, via the processor, applying a third tokenization technique to the sentence using a different statistical tokenization model when the second subsequent tokenization technique does not obtain the needed token according to the class of the sentence.

8. The method of claim 1, wherein applying a third tokenization technique further comprises selecting the second subsequent statistical tokenization model to be a statistical tokenization model built using sentences to do not comprise a named entity.

9. The method of claim 7, further comprising:
   via the processor, determining whether at least one token is needed according to the class and a tokenization result of the second subsequent tokenization technique; and
   when no further tokens are needed, via the processor, discontinuing processing of the sentence and outputting at least one token determined for the sentence.

10. A method of processing text within a natural language understanding (NLU) system, the method comprising:
    via a processor, determining a class for a sentence received by the NLU system at runtime;
    via the processor, processing the sentence using a first statistical tokenization model;
    via the processor, processing the sentence using a named entity when a token that is needed according to the class is not extracted using the first statistical tokenization model;
    via the processor, processing the sentence using a second subsequent statistical tokenization model only when a token that is needed according to the class is not extracted using the named entity; and
    via the processor, outputting a token determined according to at least one of the first statistical tokenization model, the named entity, or the second subsequent statistical tokenization model.

11. The method of claim 10, further comprising, via the processor, selecting the first statistical tokenization model to be a statistical tokenization model trained using sentences that comprise at least one named entity that has a low correlation with the token.

12. The method of claim 10, further comprising, via the processor, selecting the second subsequent statistical tokenization model to be a statistical tokenization model training using sentences that do not comprise a named entity.

13. A computer program product comprising:
    a computer-readable storage comprising computer-usable program code stored thereon that processes text within a natural language understanding system, the computer-readable storage comprising:
    computer-usable program code that applies a first tokenization technique to a sentence using a statistical tokenization model;
    computer-usable program code that applies a second subsequent tokenization technique to the sentence using a named only entity only when the first tokenization technique does not extract a needed token according to a class of the sentence; and
    computer-usable program code that outputs a token determined according to at least one of the tokenization techniques.

14. The computer program product of claim 13, wherein the computer-readable storage further comprises:
    computer-usable program code that first determines the class for the sentence using a statistical classification model; and computer-usable program code that determines whether tokenization is needed according to the class of the sentence.

15. The computer program product of claim 14, wherein the computer-readable storage further comprises computer-usable program code that identifies the needed token according to the class.

16. The computer program product of claim 13, wherein the computer-usable program code that applies a first tokenization technique further comprises computer-usable program code that selects the first statistical tokenization model to be a statistical tokenization model trained using sentences comprising a named entity having a low correlation with the needed token.

17. The computer program product of claim 13, the computer-readable storage further comprising:
   computer-usable program code that determines whether at least one token is needed according to the class and a tokenization result of the first tokenization technique; and
   computer-usable program code that discontinues processing of the sentence and outputs at least one token determined for the sentence when no further tokens are needed.

18. The computer program product of claim 13, wherein the computer-readable storage further comprises computer-usable program code that applies a third tokenization technique to the sentence using a different statistical tokenization model when the second subsequent tokenization technique does not obtain the needed token according to the class of the sentence.

19. The computer program product of claim 13, wherein the computer-usable program code that applies a third tokenization technique further comprises computer-usable program code that selects the second subsequent statistical tokenization model to be a statistical tokenization model built using sentences to do not comprise a named entity.

20. The computer program product of claim 18, wherein the computer-readable storage further comprises:
   computer-usable program code that determines whether at least one token is needed according to the class and a tokenization result of the second subsequent tokenization technique; and
   computer-usable program code that discontinues processing of the sentence and outputs at least one token determined for the sentence when no further tokens are needed.

* * * * *